United States Patent
Ashtiani et al.

[11] Patent Number: 5,990,661
[45] Date of Patent: Nov. 23, 1999

[54] CIRCULATING CURRENT BATTERY HEATER

[75] Inventors: Cyrus N. Ashtiani, Bloomfield Hills; Thomas A. Stuart, Toledo, both of Mich.

[73] Assignees: DaimlerChrysler Corporation, Auburn Hills, Mich.; University of Toledo, Toledo, Ohio

[21] Appl. No.: 09/070,331

[22] Filed: Apr. 30, 1998

[51] Int. Cl.[6] .......................... H01M 10/44; H01M 10/46
[52] U.S. Cl. ............................................................ 320/128
[58] Field of Search .................................. 320/103, 118, 320/128, 135, 153, DIG. 14, DIG. 33

[56] References Cited

U.S. PATENT DOCUMENTS

| | | | |
|---|---|---|---|
| 3,767,995 | 10/1973 | Kaminski et al. | 320/125 |
| 4,209,736 | 6/1980 | Reidenbach | 320/152 |
| 5,760,488 | 6/1998 | Sonntag . | |
| 5,808,469 | 9/1998 | Kopera . | |
| 5,824,432 | 10/1998 | Currie . | |
| 5,831,514 | 11/1998 | Hilpert et al. . | |

*Primary Examiner*—Edward H. Tso
*Attorney, Agent, or Firm*—Jennifer M. Stec

[57] ABSTRACT

A circuit for heating energy storage devices such as batteries is provided. The circuit includes a pair of switches connected in a half-bridge configuration. Unidirectional current conduction devices are connected in parallel with each switch. A series resonant element for storing energy is connected from the energy storage device to the pair of switches. An energy storage device for intermediate storage of energy is connected in a loop with the series resonant element and one of the switches. The energy storage device which is being heated is connected in a loop with the series resonant element and the other switch. Energy from the heated energy storage device is transferred to the switched network and then recirculated back to the battery. The flow of energy through the battery causes internal power dissipation due to electrical to chemical conversion inefficiencies. The dissipated power causes the internal temperature of the battery to increase. Higher internal temperatures expand the cold temperature operating range and energy capacity utilization of the battery. As disclosed, either fixed frequency or variable frequency modulation schemes may be used to control the network.

19 Claims, 1 Drawing Sheet

CIRCULATING CURRENT BATTERY HEATER

BACKGROUND OF THE INVENTION

1. Field of the Invention

The present invention relates generally to devices for heating batteries. More particularly, the invention relates to electrical circuits for using the stored energy of a battery to heat either the battery or another battery.

2. Background and Summary of the Invention

With the current growth in electrical and electronic technology, there is a growing interest in using batteries as a primary source of power, for backup applications, and for starter, lighting, ignition (SLI) applications. Electric vehicles, hybrid vehicles, military electronic systems, consumer vehicles, communications systems, medical emergency equipment, and handheld power tools are among the more promising applications requiring batteries.

Batteries provide a uniquely portable source of energy that is not dependent on a connection to a power grid. However, the operation of a battery is limited by a number of factors, one of which is temperature. At low temperatures the capacity of a battery to store energy, the maximum value of discharge current which can be drawn from the battery, and the cold cranking amps capability decrease substantially. Many applications require batteries either as a primary power source, such as; electric vehicles, hybrid vehicles, and handheld power tools, or as; a backup power source such as communications systems, medical emergency equipment, and military electronic systems, or also as; an SLI source such as commercial vehicles. Batteries used for SLI applications at cold temperatures additionally must be capable of supplying greater amounts of cold cranking current to overcome the increased engine resistance caused by decreased engine oil viscosity at low temperatures. Most if not all of these devices are exposed to outdoor environments and therefor must be able to operate at low temperatures.

Current methods of operating batteries at low temperatures employ means for heating the battery from an external source, such as warm air heating, liquid heating, and thermal jackets. Conventional battery heating systems typically use a separate power source to power a heating element which generates the required heat. The resultant heat is then transferred to the battery by either a convection system or a conduction system. Convection systems blow hot air across the battery, whereas conduction systems apply heat directly to the surface of the battery. Each of these systems warm the battery by heating the external surface of the battery. By applying heat to the external surface a significant amount of the generated heat is lost to the external environment. Both convection and conduction systems additionally require some form of mechanical structure co-located with the battery. Also, warm air heating and liquid heating require complex mechanical systems that use substantial amounts of external power. These constraints limit the portability of batteries and demand the availability of an external power source.

A system employing thermal jackets typically includes a flexible insulator that wraps around the exterior of a battery. On the inner surface of the insulator is an externally powered heating element. While thermal jackets do not require a complex mechanical system, extra space around the individual batteries must be set aside. Additionally, the thermal jacket systems known in the art must be powered by a separate power source or power grid. While heating systems and thermal jackets can be used to extend the ambient temperature range within which batteries can be operated, they have not proven capable of efficiently heating a battery without an external power source and bulky external mechanical attachments.

Accordingly, it is desirable to overcome the disadvantages associated with the prior art systems. The present invention addresses this problem by circulating energy from within the battery into lossless or nearly lossless energy storage devices and then back into the battery causing the battery to dissipate power internally due to the electrical-to-chemical energy conversion losses and conduction losses of the battery. The internally dissipated power heats the battery, causing the internal temperature to rise. A higher internal temperature increases the operating temperature range, improves the cold cranking amps capability, and improves the energy capacity utilization of the battery. The circuit of the present invention does not require a complex mechanical structure, and efficiently heats the battery from the inside out. The circuit enhances the portability of batteries into cooler operating environments by using the internal energy of the battery for self-heating. The circuit takes energy from the battery and stores it in an essentially lossless element and then recirculates that energy back into the battery. In transferring energy first out of the battery and then back into the battery some losses will occur within the battery due to inefficiencies in converting electrical energy into chemical energy. The losses result in increased heat within the battery thereby causing the battery to heat from the inside out. Additionally, there are very few constraints on the location of the circuit relative to the battery. It is possible to place the circuit a significant distance away from the battery, depending on the magnitude of the circulating current.

BRIEF DESCRIPTION OF THE DRAWINGS

For a more complete understanding of the invention, its objects and advantages, reference may be had to the following specification and to the accompanying drawings in which.

DETAILED DESCRIPTION OF THE PREFERRED EMBODIMENT

Figure 1:
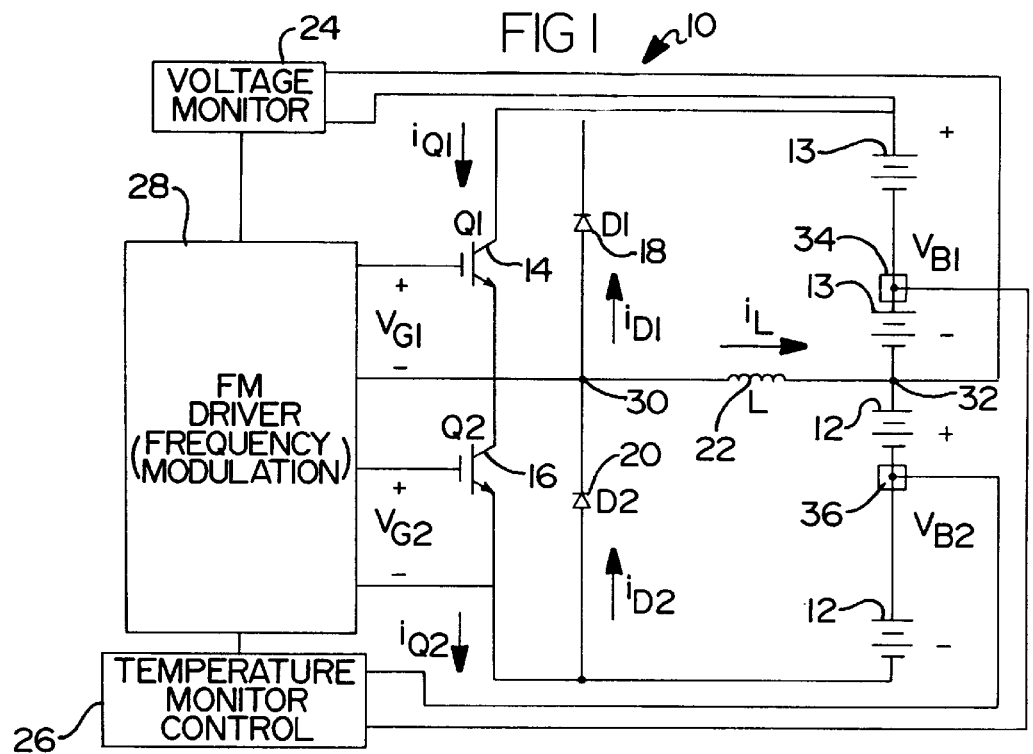
FIG. 1 is a schematic diagram showing a preferred embodiment of the invention.

Referring to FIG. 1, an exemplary circulating current battery heater circuit 10 according to the teachings of the present invention is shown. The present implementation of circuit 10 is a variable frequency half-bridge configuration operating at a frequency less than 25 Khz. The circuit 10 heats a string of Li-Ion batteries 12, 13 having a combined voltage of 144 volts. Other types of batteries including but not limited to; lead-acid, NiCad, NiMH, alkaline, and lithium batteries are within the scope of the present invention. Additionally, either one or more batteries 12, 13 may be heated, such as batteries units ranging from a 12 volt car starter battery to 600 volt battery assemblies for electric cars or buses. Although the preferred embodiment employs a variable frequency modulation (FM) technique, the principles of the invention may equally be extended to the constant frequency pulse-width modulation technique. The circuit 10 should be operated over a frequency range that minimizes the inductor weight and size without creating excessive overall losses in the inductor core, coil, and switching losses of the power semiconductor switches.
}

The presently preferred embodiment includes a pair of Insulated Gate Bipolar Transistors (IGBTs) 14 and 16 connected in a half-bridge configuration. However, the principles of the invention may be extended to the use of other switching devices such as; MOSFET's, BJT's, and MCT's. Anti-parallel diodes 18 and 20 are connected in parallel with IGBTs 14 and 16 respectively. Inductor 22 is connected from the junction 30 of IGBTs 14 and 16 to the junction 32 of the energy storage means (or upper string of batteries) 13 and the lower string of batteries 12. Although an inductor is used for the series resonant element in the preferred embodiment, a series LC combination is also within the scope of the invention.

The energy storage means 13 in the present embodiment is preferably a string of batteries equivalent in voltage to the lower string of batteries 12. However, the energy storage means may also include other energy storage devices such as various types of capacitors including; ceramic, MLC, plastic film, plastic foil, oil-filled, aluminum electrolytic, and tantalum electrolytic capacitors. A voltage monitor 24 is provided for sensing voltage across each string of batteries 12 and 13. A temperature monitor control 26 is provided for sensing the temperature of each of the batteries via temperature sensors 34 and 36 associated with each string of batteries 12 and 13. The invention also encompasses potentially monitoring the circulating current and charge in batteries 12 and 13. Current monitoring may be accomplished by use of a Hall effect circuit or a resistive shunt in series with inductor 22. Driving an integrator circuit in a feedback loop with a sensed current signal would provide battery charge and current monitoring and control. Both current and charge monitor and control circuits are well known in the art. The outputs of the voltage monitor 24 and the temperature monitor control 26 connect to FM driver 28 which may also function as the system controller. A battery undervoltage or overtemperature condition will be sensed by the monitor circuits 24, 26 which will disable FM driver 28, thereby protecting the battery from a potentially destructive operating condition. The two outputs of FM driver 28 connect from gate to emitter on each of the IGBTs 14 and 16.

In operation, the preferred embodiment employs frequency modulation with variable frequency with a maximum value of 25 kilohertz. However, the principles of the invention may be readily extended to a circuit employing pulse-width modulation. As is known in the art, pulse-width modulators control a circuit by operating at a fixed frequency and varying the pulse-width in response to a controlling input. A frequency modulator controls a circuit by varying the total period of the signal.

Figure 2:
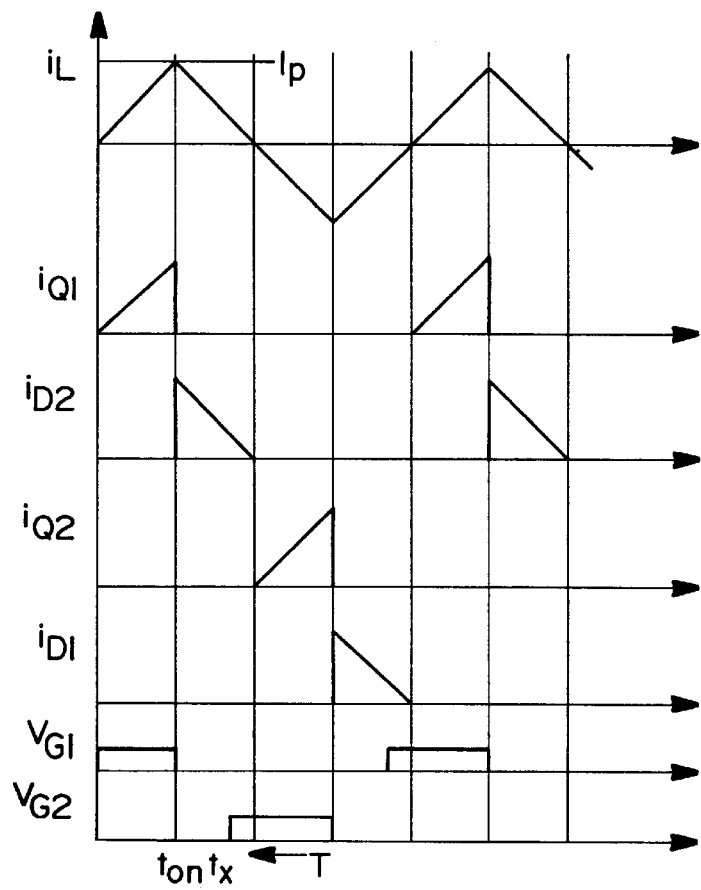
FIG. 2 is a signal diagram showing the current and voltage waveforms associated with a preferred embodiment of the present invention.

Referring to FIGS. 1 and 2, the $V_{G1}$ output from FM driver 28 drives transistor Q1 14 into the ON state. Voltage from energy storage means 13 is impressed across inductor 22 causing current $i_L$ to linearly increase with time, storing energy within inductor 22. At time $t_{ON}$ (FIG. 2) FM driver 28 drives the $V_{G1}$ signal into the low state. As Q1 14 begins to turn off the current which flows through inductor 22 will begin to conduct through lower battery 12 and up through anti-parallel diode 20. Voltage from the batteries 12 is impressed across inductor 22 causing current $i_L$ to linearly decrease. During this mode of operation energy is transferred from inductor 22 to lower string of batteries 12.

As energy is either transferred into or out of the strings of batteries 12 and 13, conduction losses and electrical-to-chemical conversion inefficiencies cause power to be dissipated within the batteries. The dissipated power causes the internal temperature of the batteries to rise resulting in very efficient self-heating of the batteries.

At time $t_x$ the FM driver 28 drives the $V_{G2}$ output high, turning on transistor Q2 16. Turning on Q2 16 while current continues to flow through anti-parallel diode 20 results in virtually zero turn-on losses in Q2 16. The turn-on losses of an IGBT are directly proportional to the square of the voltage from collector to emitter. Normally, with most modulation schemes the voltage from collector to emitter at turn-on would be approximately 72 volts in this circuit configuration. However, by turning on IGBT 16 while current is flowing in anti-parallel diode 20, the voltage impressed from collector to emitter at turn-on is approximately one diode drop. A diode drop for a high voltage diode is approximately one or two volts. Therefore, turn-on losses are decreased by more than a factor of 5,000.

Current in anti-parallel diode 20 continues to decrease until it reaches zero amps, at which time $i_L$ begins to flow into the collector of Q2 16 and up through lower batteries 12. As current flows from batteries 12 through inductor 22 energy is transferred from the string of batteries 12 into inductor 22 until Q2 16 turns off. At time T the FM driver 28 drives the $V_{G2}$ output to the low state turning off Q2 16. As Q2 16 turns off, the current flowing through inductor 22 begins to flow up through anti-parallel diode 18 and down through the upper string of batteries 13. The voltage from batteries 13 is impressed across inductor 22 causing current $i_L$ to begin to linearly increase. During this period, energy is transferred from inductor 22 into upper string of batteries 13. At some time prior to inductor current $i_L$ reaching zero, Q1 14 is turned on, thereby attaining virtually lossless turn-on in a manner similar to transistor Q2 16. When current through inductor 22 reaches zero amps, anti-parallel diode 18 becomes back-biased and the current once again begins to flow through the loop comprising IGBT 14, inductor 22, and upper string of batteries 13.

From the foregoing it will be understood that the invention provides a circuit that employs a low loss network for using the internal energy of a battery to heat either the same battery or another battery. The circuit may be readily scaled by selection of appropriate switching devices and energy storage devices to accommodate different quantities of batteries, different types of batteries, and different methods of storing the intermediate energy. The circuit thus provides a novel and efficient means for heating batteries in a wide range of applications.

Through the use of a low loss switched energy storage network, the invention can provide a means of increasing the effective operating temperature range of batteries and improving the utilization of the energy stored within batteries operating within low temperature environments. Additionally the invention improves the low temperature charging efficiency of a battery. The circuit enhances the portability of systems that employ batteries by providing means for using energy stored within the battery to self heat the battery. The invention is therefore ideally suited for heating electric vehicle battery assemblies, as well as batteries used with hand held power tools. The circuit will heat both multiple batteries and single batteries using either variable frequency modulation or pulse-width modulation.

While the invention has been described in its presently preferred embodiment, it will be understood that the invention is capable of certain modifications and change without departing from the spirit and scope of the invention as set forth in appended claims.

What is claimed is:

1. A circuit for heating a first energy storage device, the circuit comprising:

first switching means operative in open and closed circuit states;

a first element for providing a unidirectional current path connected in parallel with the first switching means;

second switching means operative in open and closed circuit states, the second switching means connected in series with the first switching means;

a switch junction formed at the connection of the first switching means and the second switching means;

a second element for providing a unidirectional current path connected in parallel with the second switching means;

a series resonant element, operable for storing energy, connected to the switch junction;

second energy storage means connected in a first loop with the first switching means and the series resonant element; and said first energy storage device connected in a second loop with the second switching means and the series resonant element.

2. The circuit of claim 1 wherein the series resonant element is an inductor.

3. The circuit of claim 1 wherein the series resonant element is an inductor and a capacitor in series.

4. The circuit of claim 1 including modulation means for controlling the first switching means and the second switching means.

5. A circuit for heating a plurality of batteries, the circuit comprising:

first switching means operative in open and closed circuit states;

a first diode connected in parallel with the first switching means;

second switching means operative in open and closed circuit states, the second switching means connected in series with the first switching means;

a switch junction formed at the connection of the first switching means and the second switching means;

a second diode connected in parallel with the second switching means;

a series resonant element, operable for storing energy, connected to said switch junction;

at least a first battery connected in a first loop with the first switching means and the series resonant element;

a second battery connected in a second loop with the second switching means and the series resonant element;

modulation means operatively associated with the first switching means and the second switching means, the modulation means selected from the group of: pulse-width modulation means and frequency modulation means; and a sensor operatively associated with the modulation means for controlling the operation thereof.

6. The circuit of claim 5 wherein the series resonant element is an inductor.

7. The circuit of claim 5 wherein the series resonant element is an inductor and a capacitor in series.

8. The circuit of claim 5 wherein the sensor is selected from the group of: Hall effect current sensors, resistive shunt current sensors, battery temperature sensors, and battery voltage sensors.

9. A circuit for heating a battery having a plurality of cells, the circuit comprising;

a first transistor operative in open and closed circuit states;

a first diode connected in parallel with the first transistor;

a second transistor operative in open and closed circuit states, the second transistor connected in series with the first transistor;

a switch junction formed at the connection of the first transistor and the second transistor;

a second diode connected in parallel with the second transistor;

a series resonant element, operable for storing energy, connected to said switch junction;

a first cell connected in a first loop with the first transistor and the series resonant element; and a second cell connected in a second loop with the second transistor and the series resonant element.

10. The circuit of claim 9 wherein the series resonant element is an inductor.

11. The circuit of claim 9 wherein the series resonant element is an inductor and a capacitor in series.

12. The circuit of claim 9 including modulation means for controlling the first transistor and the second transistor.

13. The circuit of claim 12 wherein the modulation means is pulse-width modulation.

14. The circuit of claim 12 wherein the modulation means is frequency modulation.

15. The circuit of claim 12 including at least one sensor operatively associated with the modulation means for controlling the operation thereof.

16. A circuit for heating a plurality of batteries, the circuit comprising;

a first IGBT operative in open and closed circuit states;

a first diode connected in parallel with the first IGBT;

a second IGBT operative in open and closed circuit states, the second IGBT connected in series with the first IGBT;

a switch junction formed at the connection of the first IGBT and the second IGBT;

a second diode connected in parallel with the second IGBT;

an inductor, operable for storing energy, connected to said switch junction;

a first battery connected in a first loop with the first IGBT and the inductor; and a second battery connected in a second loop with the second IGBT and the inductor.

17. A method of heating a plurality of batteries, said method comprising:

connecting a first energy storage element across at least a first battery;

conducting energy from said first battery through the first energy storage element, thereby heating said first battery by dissipating power within said first battery;

redirecting the energy from the first storage element into a second storage element;

recycling the energy from the second storage element into the first storage element; and redirecting the energy from the first storage element into said first battery, thereby heating said first battery by dissipating power within said first battery.

18. The method of claim 17 which includes:

sensing the temperature of said first battery; and adjusting the ratio of time during which current is conducted through said first battery dependent on the temperature of said first battery.

19. The method of claim 17 wherein the second storage element is a second battery.

* * * * *

UNITED STATES PATENT AND TRADEMARK OFFICE
CERTIFICATE OF CORRECTION

PATENT NO : 5,990,661
DATED : November 23, 1999
INVENTOR(S) : Cyrus N. Ashtiani and Thomas A. Stuart It is certified that error appears in the above-identified patent and that said Letters Patent are hereby corrected as shown below:

Column 1, after the title, please insert the following new heading and paragraph:

--STATEMENT REGARDING FEDERALLY SPONSORED RESEARCH OR DEVELOPMENT

This invention was made with Government support under NREL subcontract number ZAN-6-16334-01, prime contract number DE-AC36-83CH10093 issued by the Department of Energy. The government has certain rights in this invention."--

Signed and Sealed this

Seventeenth Day of April, 2001

*Attest:*

NICHOLAS P. GODICI

*Attesting Officer*    *Acting Director of the United States Patent and Trademark Office*